J. W. HARRISON.
Dumping Platforms for Railroad Cars.

No. 143,758. Patented Oct. 21, 1873.

Witnesses.
J. J. Gibson
Oscar Nordmark

Inventor.
John W. Harrison
By G. F. Ferriss
Atty.

UNITED STATES PATENT OFFICE.

JOHN W. HARRISON, OF NILES, MICHIGAN.

IMPROVEMENT IN DUMPING-PLATFORMS FOR RAILROAD-CARS.

Specification forming part of Letters Patent No. 143,758, dated October 21, 1873; application filed August 9, 1873.

*To all whom it may concern:*

Be it known that I, JOHN W. HARRISON, of Niles, in the county of Berrien and State of Michigan, have invented certain new and useful Improvements in a Car Tipping Platform; and I do hereby declare the following to be a full, clear, and exact description of the invention, such as will enable others skilled in the art to which it pertains to make and use it, reference being had to the accompanying drawings, which form part of this specification.

The object of this invention is the construction of a platform for use upon the running-gear of cars and wagons, for the purpose of unloading such material as may be dumped.

Figure 1:
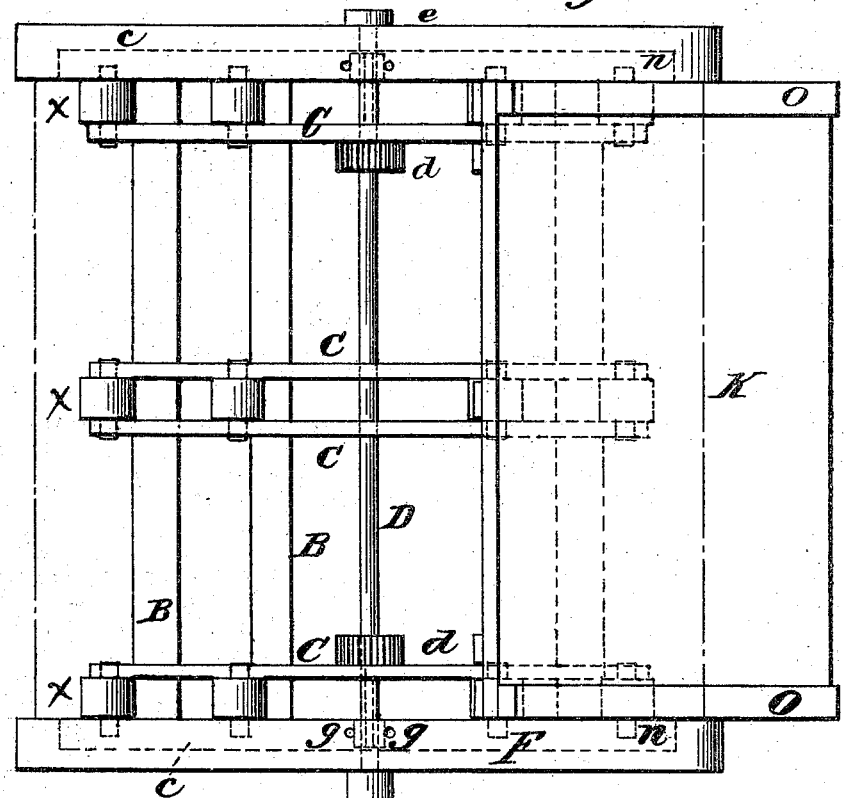
Figure 2:
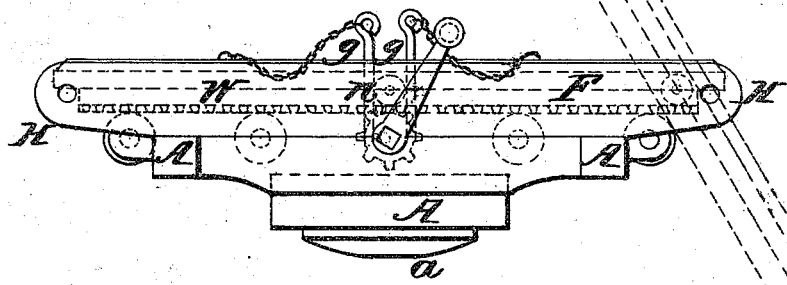

Referring to the accompanying drawing, Figure 1 is a plan view of the machine with the floor run to one side. Fig. 2 is an end view of the machine with the bulk-head removed and the floor dumped.

A is a strip running the length of the platform, and having the projections $a$, which serve as a coupling-piece between the platform and the running-gear in cars and wagons. Upon this strip is placed a frame, consisting of the two pairs of longitudinal pieces B B and the three pairs of cross-pieces C C C. Between each pair of cross-pieces, and below the surface of the same, are journaled anti-friction rollers $x\ x\ x$. A shaft, D, having two pinion-wheels, $d\ d$, near the outer pair of cross-pieces, a crank, E, on one end, and a head, $e$, with holes for a crow-bar on the other, passes centrally and longitudinally through the frame, and is supported in the cross-pieces C C C. F F are bulk-head gages attached to the outer cross-pieces, and forming therewith grooves $f\ f$ for the rollers on the sliding floor, and having holes $g\ g$ for the locking-pins, and holes H H for convenience. K is a sliding floor, upon the under side of which are secured the cog-bars L L, to operate with the pinion-wheels, and the gage-bars M M M, to operate between the pairs of cross-pieces and on the anti-friction rollers. N is a pivot-shaft passing longitudinally and centrally through the floor, and having on its ends the rollers $n\ n$. O O are strengthening-ledges.

The platform and the sliding floor being in position, and the lock-pins withdrawn, the turning of the shaft revolves the pinion-wheels, which operation on the cog-bar forces the floor to one side. The gage-bars, fitting snugly between the cross-pieces on the rollers, keep the floor in position, and cause it to move easily. The pivot-shaft and the rollers thereon permit the floor to dump as it passes over the rounded ends of the cross-pieces, and secure it from being thrown from the frame.

Dumping-platform cars of various constructions have been used; and the devices presented in this invention, taken separately, are, perhaps, not new; but the peculiar arrangement herein set forth embraces combinations essentially different in plan and operation.

What I claim is—

1. The combination of the strip A', frame B B, C C C, friction-rollers $x\ x$, bulk-heads F F, and the shaft D, having pinion-wheels $d\cdot d$, all substantially as and for the purpose set forth.

2. The combination of the sliding floor K, cog-bars L L, gage-bars M M M, pivot-shaft N, and rollers $n\ n$, all substantially as and for the purpose set forth.

In testimony that I claim the foregoing I have hereunto set my hand this 17th day of July, 1873.

JOHN W. HARRISON.

Witnesses:
 JOSEPH S. BACON,
 EDWARD BACON.